US006296815B1

United States Patent
Walker et al.

(10) Patent No.: US 6,296,815 B1
(45) Date of Patent: Oct. 2, 2001

(54) APPARATUS FOR EXSITU THERMAL REMEDIATION

(75) Inventors: Stanley Lane Walker, Fresno; Peter Robert Harvey, Houston, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/258,857

(22) Filed: Feb. 26, 1999

Related U.S. Application Data

(60) Provisional application No. 60/076,278, filed on Feb. 27, 1998.

(51) Int. Cl.[7] .................................. B09C 1/06; F23G 7/14
(52) U.S. Cl. ...................... 422/199; 422/184.1; 110/236; 110/240; 110/250; 405/128
(58) Field of Search ............................. 202/83; 110/236, 110/240, 241, 250, 242, 346; 422/184.1, 174, 199; 588/227, 228, 229; 405/128

(56) References Cited

U.S. PATENT DOCUMENTS

| | | |
|---|---|---|
| 1,498,528 * | 6/1924 | Alexander . |
| 4,144,311 * | 3/1979 | Grosche et al. ...................... 423/155 |
| 4,202,282 | 5/1980 | Hobbs et al. .......................... 110/346 |
| 4,337,711 * | 7/1982 | Bolton .................................... 110/346 |
| 4,670,634 | 6/1987 | Bridges et al. ................... 219/10.81 |
| 4,697,532 * | 10/1987 | Furukawa et al. ..................... 110/346 |
| 4,984,594 | 1/1991 | Vinegar et al. ......................... 134/21 |
| 5,100,638 * | 3/1992 | Levin .................................... 423/449 |
| 5,127,343 | 7/1992 | O'Ham .................................. 110/233 |
| 5,330,291 * | 7/1994 | Heath et al. ........................... 405/128 |
| 5,363,777 | 11/1994 | Yoshimoto et al. .................. 110/241 |
| 5,482,402 * | 1/1996 | Nelson .................................. 405/128 |
| 5,602,298 * | 2/1997 | Levin .................................... 588/227 |

* cited by examiner

Primary Examiner—Hien Tran

(57) ABSTRACT

An apparatus is disclosed for thermal desorption of contaminants from contaminated material, the apparatus including: a plurality of first insulated boxes, each insulated box, defining a volume effective for holding contaminated material, and each insulated box defining an opening at the top of the insulated box; at least one top effective to fit on the opening at the top of the insulated box and each top defining a pattern of heater orifices; a plurality of heaters, the heaters being insertable into the volume for holding contaminated material, through the heater orifices defined by the top; and a vapor extraction system effective to remove vapors from within the volume for holding contaminated material.

10 Claims, 5 Drawing Sheets

APPARATUS FOR EXSITU THERMAL REMEDIATION

This application claims the benefit of U.S. Provisional Application No. 60/076,278 filed Feb. 27, 1998, the entire disclosure of which is hereby incorporated by reference.

FIELD OF THE INVENTION

The present invention relates to an apparatus for thermal desorption of contaminants from contaminated materials.

BACKGROUND TO THE INVENTION

Both insitu and exsitu methods to remove contaminates from soils are known. U.S. Pat. No. 4,202,282 is exemplary of exsitu method. In this method, contaminated soil is placed on a conveyer belt and infrared heat is used to drive off gasses from contaminated material. Substantial equipment is required, and either this equipment must be moved to the contaminated site, or the contaminated material must be moved to the location of the remediation equipment. It would be preferable to have a method wherein the equipment is more readily relocated.

U.S. Pat. No. 4,984,594 discloses a method whereby the soil is heated insitu to remove contaminants. Volatile substances in the soil are vaporized by the heat and drawn upward and gathered into a vacuum system where they are condensed in traps for subsequent treatment, or disposal. Soil heating is effected by means of an electric heater that is placed upon the soil surface. The heater is a mesh of electrically-conductive wires, and is in contact with the soil. Heat is transferred into the soil by thermal conduction. Heater blankets for insitu remediation are effective for removing contaminants from a relatively flat surfaces, but soil surfaces are often uneven so that at least some soil must be removed for decontamination. Further, some contaminates are located too deep in soil for remediation by heat injection from the surface.

Heat can be injected to greater depths, for example, by use of radio frequency energy, as suggested in U.S. Pat. No. 4,670,634. Insitu heating can be useful, but it can be difficult to target a specific contaminated region, and even when insitu heating is applied, there may be a volume of contaminated soil that is better removed and treated exsitu. It would be advantageous to have an apparatus to perform this exsitu remediation wherein the equipment is easily transported.

U.S. Pat. No. 5,127,343 suggests a heater tray for exsitu remediation of soil. The tray is shallow and wide and heat is applied radiantly from above the soil. Vapors are drawn through the soil and treated. Although the tray into which the soil is placed is said to be movable by a trailer, the limited depth of the tray results in only a relatively small amount of soil being treatable at one time. The process of spreading contaminated soil into the tray and removing remediated soil, and waiting for the soil to cool sufficiently for handling, is time consuming and labor intensive. It would be desirable to have an apparatus to treat soils exsitu wherein the apparatus is transportable by a trailer, and wherein a greater volume of soil can be treated at one time, and wherein more of the equipment could be used continuously.

It is therefore an object of the present invention to provide an apparatus for treating contaminated soils exsitu wherein the apparatus is readily transportable by a truck or trailer, and wherein a significant volume of contaminated soil can be treated at one time.

SUMMARY OF THE INVENTION

These and other objects are accomplished by an apparatus comprising: a plurality of first insulated boxes, each insulated box defining a volume effective for holding contaminated material, and each insulated box defining an opening at the top of the insulated box; at least one top effective to fit on the opening at the top of the insulated box and each top defining a pattern of heater orifices; a plurality of heaters, the heaters being insertable into the volume for holding contaminated material, through the heater orifices defined by the top; and a vapor extraction system effective to remove vapors from within the volume for holding contaminated material.

This apparatus can rapidly heat a large volume of soil, and only the inner boxes need be set aside for cooling after contaminated materials have been heated. The boxes can be sufficiently large that a significant volume of contaminated material can be remediated at one time, and the contaminated material can be rapidly filled by conventional earth moving equipment such as a backhoe.

DESCRIPTION OF A PREFERRED EMBODIMENT

The apparatus of the present invention is capable of heating contaminated materials to temperatures which vaporize and/or thermally destroy many common contaminates. For example, sludge from biotreaters can be reduced to a small volume of ash, PCBs and chlorinated solvents can be vaporized from soils, and many insecticides and herbicides can be decomposed or vaporized. Water present in the contaminates also vaporizes, and thus reduces the partial pressure of the contaminants enabling removal by a steam distillation effect. Reduction of pressure by providing for sealing the first and/or second box of the present invention also improves vaporization of contaminates. Alternatively, and preferably, a seal is not maintained, but air is allowed to enter the volume filled with contaminated material through the top, and travel down through the contaminated materials to a vapor removal point near the bottom of the first box. Thus; contaminates can be sweep out even if only a relatively small vapor pressure is achieved. In this embodiment, the amount of vapor removed by the vapor removal system is limited to an amount which does not remove an excessive amount of heat.

The configuration of the boxes of the present invention is relatively inexpensive to fabricate, and is thermally efficient. Further, the boxes can be readily transported. The second box is preferably the size of a standard shipping container, and equipped to be transported as a shipping container. The first boxes are preferably stackable, and multiple fit boxes can be stacked for shipping, and placed inside the second box for shipping. Further, the second box will also have room for other equipment for shipping. Thus, both volume and weight for transportation is minimized. Also, storage space at a remediation job site, and set up time is reduced by reducing the amount of material to be shipped.

The heater elements preferably extend to near the bottom of the volumes for the contaminated materials, and can provide, for example, 300 to 600 watts per foot of heat release. The heaters can be electrical resistance heaters. After contaminated material is placed in the insulated box, the top is placed on the box, and the heaters are inserted into the volume for the contaminated material, the heaters are operated until the entire volume of contaminated materials exceeds the boiling point temperature of the highest boiling contaminate present in the contaminated material.

Figure 1:
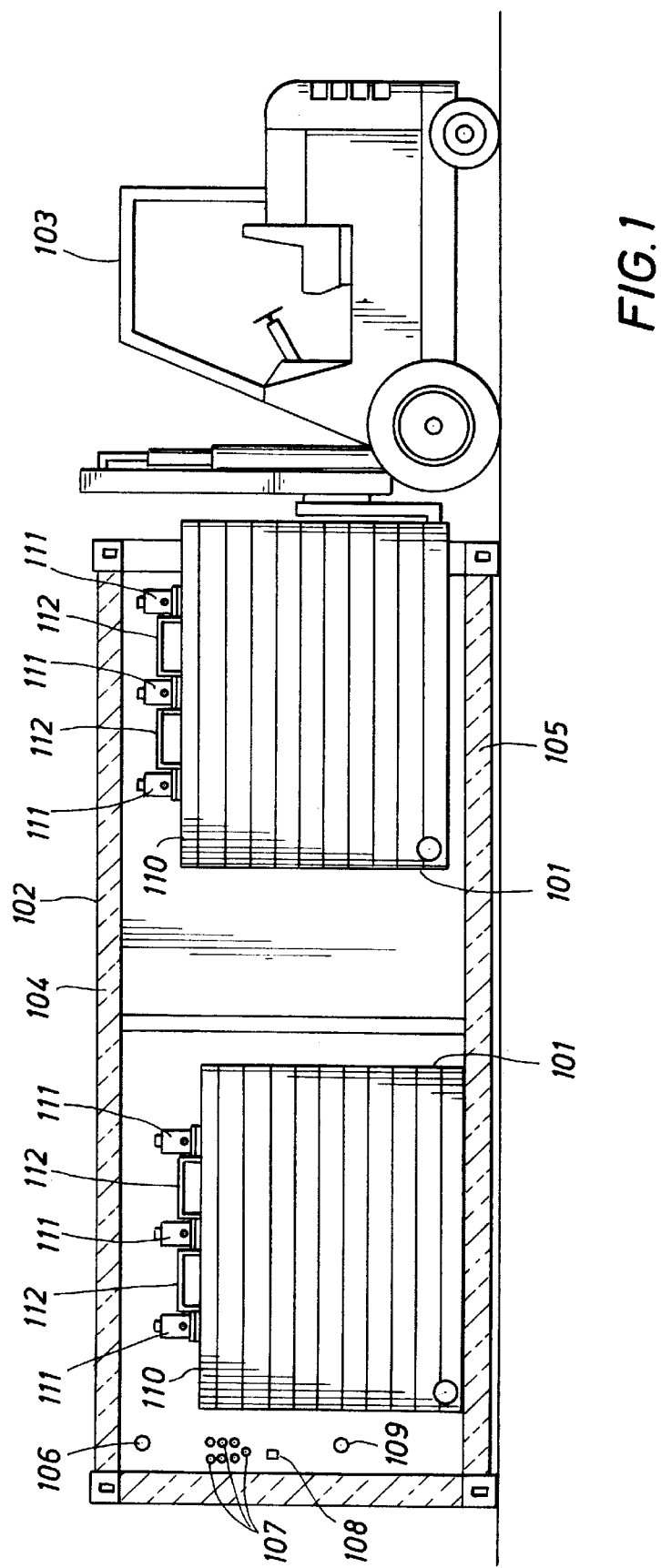
FIG. 1 is a partial cross section view of the apparatus of the present invention.

Referring now to FIG. 1, two first boxes 101 are shown inside of a second box 102. The side of the second box is not shown so that configuration of the first boxes within the second box can be shown. The second box has doors on each end (not shown) to accommodate removal of the first boxes by a forklift truck 103. The second box includes insulated top and bottom, 104 and 105 respectively, and connections for vapor removal 106 power 107 to each of the heater elements and a connection for thermal couples 108, and so that a strong vacuum is not drawn inside of the second box, an air vent 109. The second box can be insulated with a mineral insulation such as calcium silicate blocks, vermiculite, rock wool, or Fiber Frax bats. The insulation can be held in place by tie wires welded or bolted to walls of the second box, or could be held in place by providing an inside wall to contain the insulation. When a double-walled container is provided, a mineral insulation such as vermiculite can be provided between the walls.

The first boxes preferably have a depth of at least 90% of the lesser of the width or length, and more preferably between about 90 and 120%. The first boxes are preferably between about two and two and one half meters in depth in order to provide sufficient capacity for dirt, and still be readily transportable.

The second box not only provides thermal insulation, but a stationary location for interfaces with utilities and controls. Pigtails (not shown) between the first box and the connections on the inside of the second box can be provided and easily made-up after the first boxes are placed within the second box. The first boxes are shown with the tops 110 in place, and heater elements 111 in place extending through the top into the material to be treated. The tops each also have two brackets 112 for lifting the tops by a forklift truck.

Figure 2:
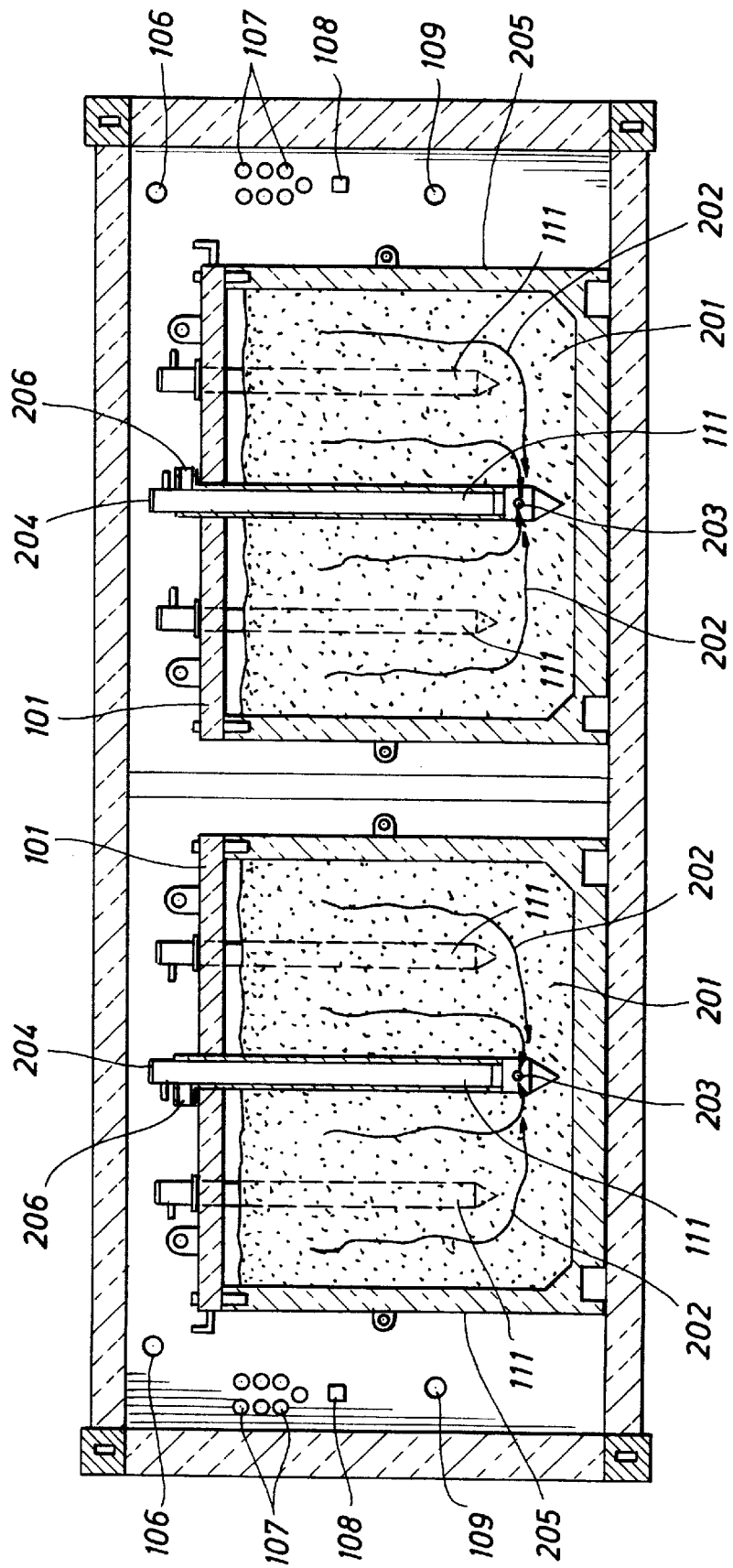
FIG. 2 is a different partial cross section of the apparatus of the present invention.

Referring now to FIG. 2, two of the first boxes 101 are shown with cross sectional views showing soil 201 to be remediated and heaters or heater element 111 in place and operating. Air and vaporized water and contaminants 202 travel down to a vapor extraction port 203 located at the bottom of the middle heater element 204. Walls 205 of the first box 101 are insulated similarly to the walls of the second box. Double walls (an outside skin and an inner skin) are preferred in order to provide a relatively smooth inside surface so the contaminated material can be easily removed. Vapors are drawn through the heater element 204 and out a vapor port 206 which is connected by a pigtail (not shown) to the connection for vapor removal 106. The vapors drawn from the connection of the second box and treated by known means to treat vapors, such as adsorption in a carbon bed and oxidation in thermal and/or catalytic oxidizers. A blower or steam adductor is used to maintain flow from the lower pressure of the volume for contaminated materials within the first boxes through the treatment system. The treatment system could be a skid mounted unit, or could be tailored for each particular remediation project. It is preferably that the vapors be treated without cooling the vapors so that a liquid water waste stream is not created. Additional heat may be added to this vapor stream in order to maintain it at a temperature above the dew point of the vapors to prevent creation of a liquid waste stream.

Figure 3:
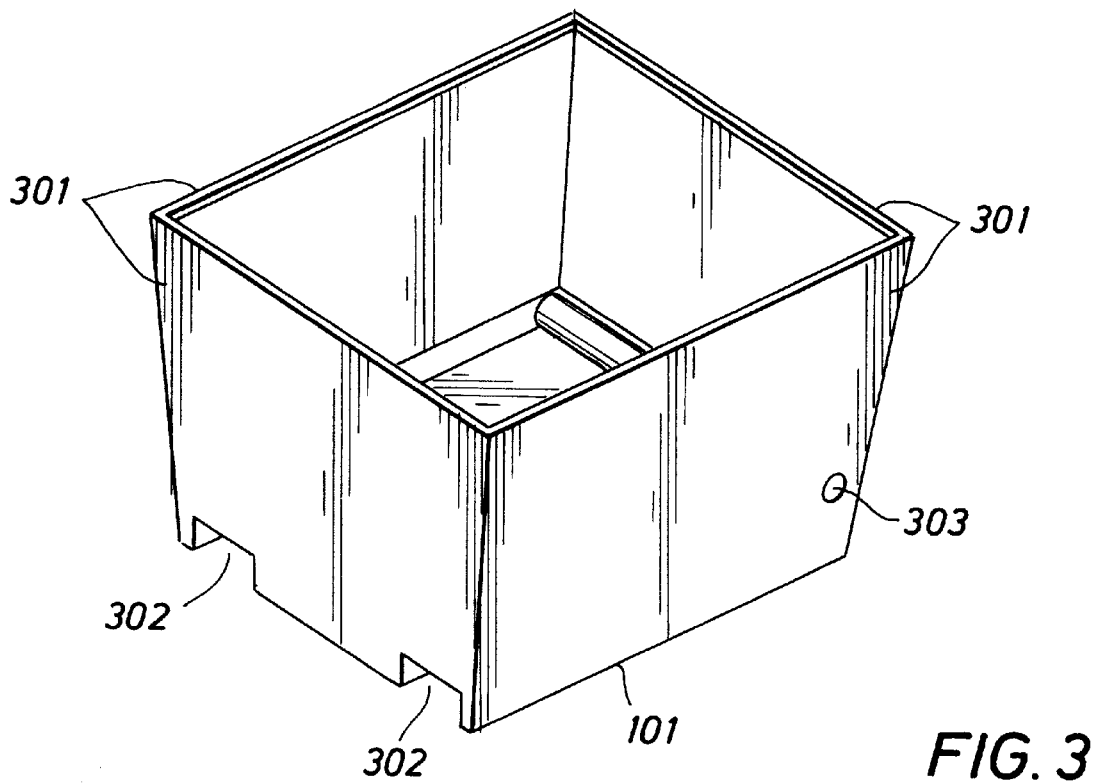
FIG. 3 is a view of the first box of the present invention.

Referring now to FIG. 3, a view of a preferred configuration for the first box 101 is shown. Sides 301 of the first box are preferably tapered by, for example, 5°, so that boxes can be stacked inside of each other for transportation. Further, the taper helps removal of treated contaminates in the event that the contaminated material fuses during the treatment process. For handling of the first box by forklifts, channels 302 for forklift prongs are provided. The channels are preferably open on the bottom side to enable dumping of the contents by lowering the forklift prongs from under the first box when the first box is pivotably supported. For pivotable support of the first box, a pipe 303 in built into a lower edge of the first box. This pipe may be fitted with a second pipe (not shown) that extends outside of the first box. The longer pipe can be placed on supports, and the box allowed to swing down as prongs of a forklift supporting the bottom of the box are lowered. In a preferred embodiment, two of the second insulated boxes could be provided with each having a support for one end of the pipe, and the contents of the fat insulated box could be dumped, and then moved with typical earth moving equipment. The pipe is perpendicular to the axis of the channels.

Figure 4:
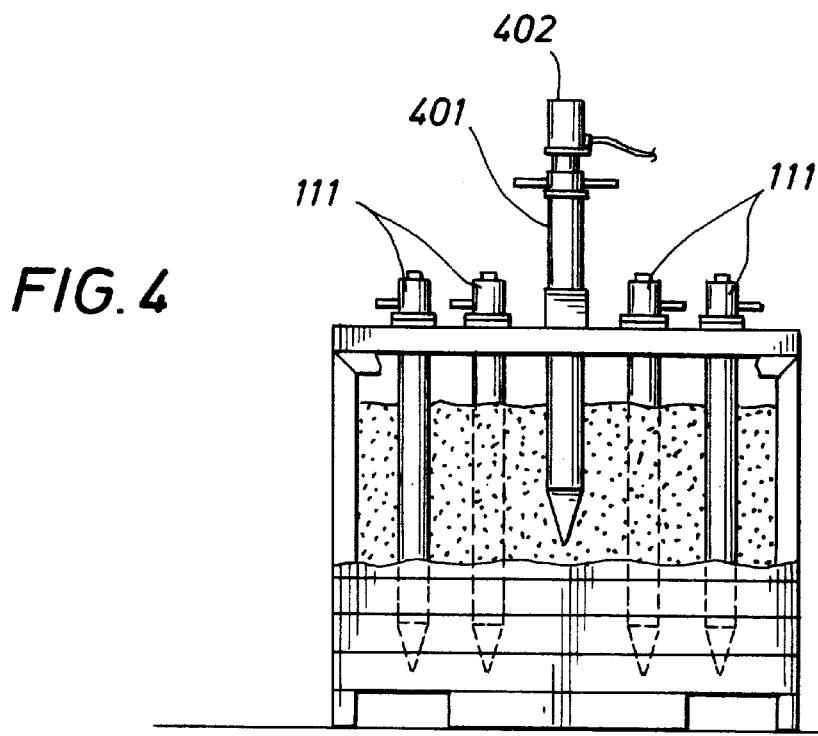
FIG. 4 is a partial cross section of the first box of the present invention with the top in place and heaters partially in place.

Referring now to FIG. 4, a partial cut away view of the first box is shown. Four heater elements 111 are shown in place and one heater element 401 is shown partially placed in to contaminated soil 201 within the first box. A vibrator 402 is shown placed on the partially placed heater element. The heaters are readily inserted into the contaminated soil preferably by vibration. Vibration of the elements minimizes compaction of the soil, and minimizes vapor spaces between the heater elements and the soil. Minimization on of these vapor spaces improves heat transfer between the heater element and the material being heated. The insulation is shown as boards, which are easily cut and formed into the required shapes.

Figure 5:
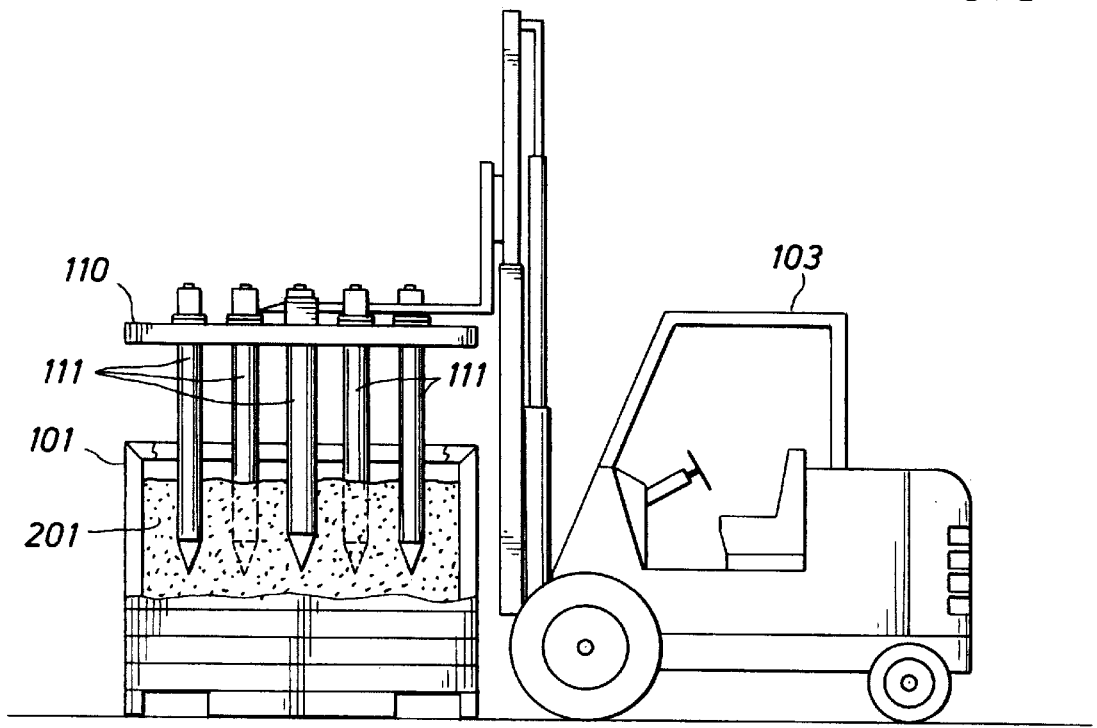
FIG. 5 shows the top and heaters being removed from the first box of the present invention.

Referring now to FIG. 5, a process for disassembling the first box after remediation of contaminated material is shown. A forklift 103 is shown lifting the top 110 from the first box 101 and pulling the heater elements 111 from remediated soil 201. Because soil will lose mass (due to vaporization of water and burning of carbonaceous matter) it will generally shrink away from the walls of the first box, and the heater elements, and therefore the heater elements will lift out with relatively little resistance. After the top is removed, the contents of the first box will cool, or could be removed hot.

Figure 6:
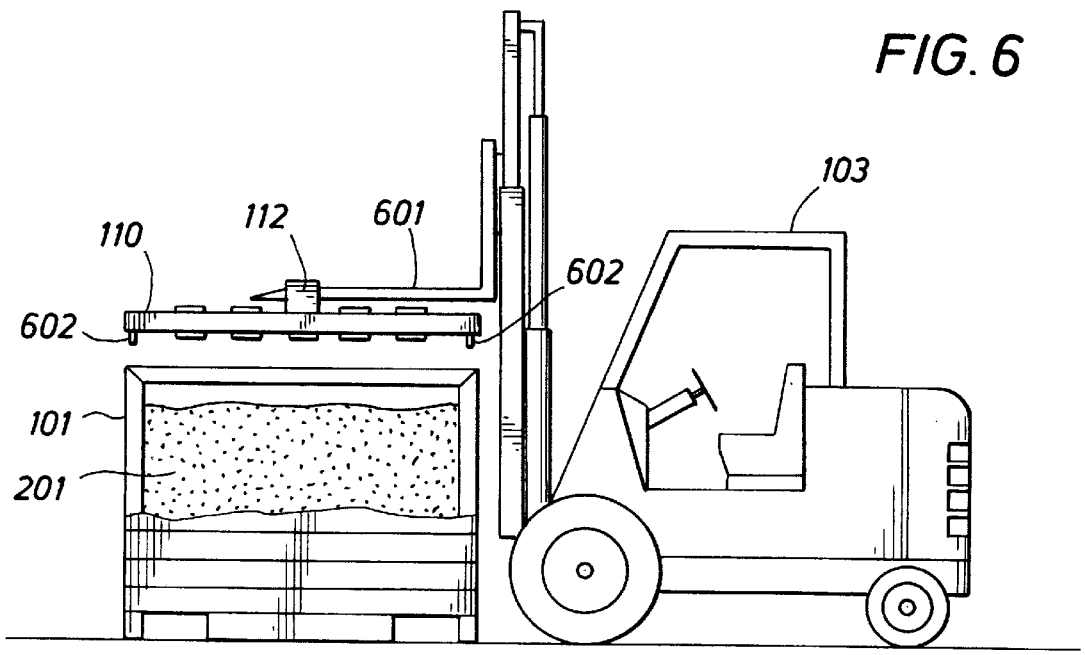
FIG. 6 shows the top being placed on the first box of the present invention.

Referring now to FIG. 6, the operation of placing the top 110 on a first box 101 that is filled with contaminated soil 201 is shown. A forklift truck 103 is shown with prongs 601 sticking into brackets 112 on the top. Clevis pins 602 are located in each of the four corners of the top for aligning the top with the first box walls.

Figure 7:
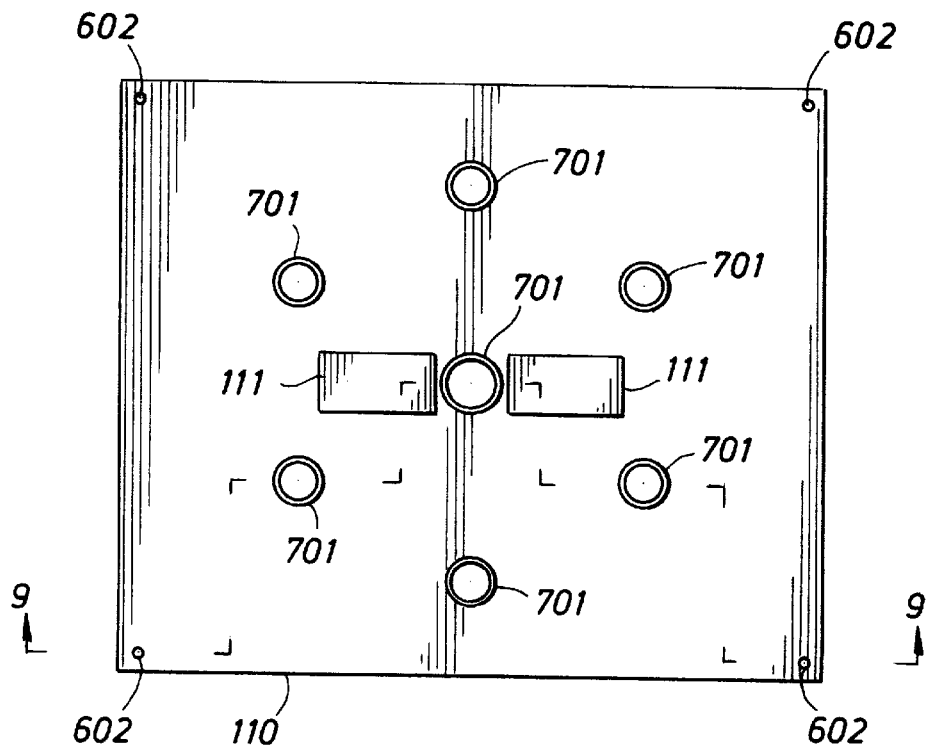
FIGS. 7 through 9 show different views and partial cross sections of the top for the first box of the present invention.
Figure 8:
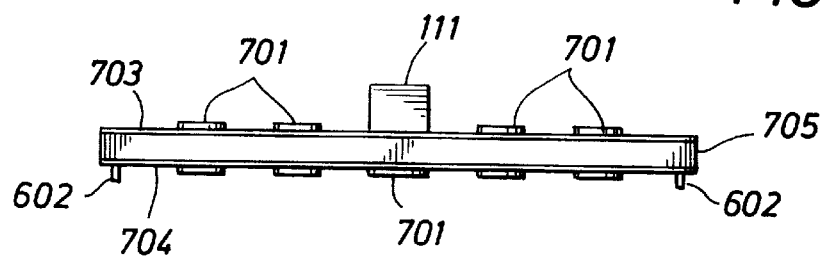
Figure 9:
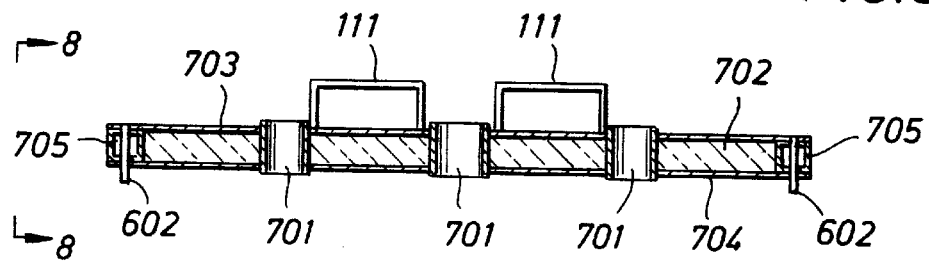

Referring now to FIGS. 7, 8 and 9, three views of the top 110 are shown. The top can consist of a rectangular frame 705 of, for example 1 ½" square steal tubing, with pins 602 in each corner. Openings 701 for heaters are provided in a pattern, with a hexagonal pattern with a center heater shown. Brackets 112 for lifting the top 110 are provided. Insulation 702 is shown between a top skin 703 and a bottom skin 704.

We claim:

1. An apparatus for thermal desorption of contaminants from contaminated material, the apparatus comprising:

a plurality of first insulated boxes, each first insulated box defining a volume effective for holding contaminated material, and each first insulated box defining an opening at the top of the first insulated box;

a plurality of tops effective to fit on the opening at the top of the first insulated boxes and each top defining a pattern of heater orifices;

a plurality of heaters, the heaters being insertable into the volumes for holding contaminated material, through the heater orifices defined by the tops;

a vapor extraction system effective to remove vapors from within the volumes for holding contaminated material; and a second insulated box, the second insulated box effective to hold at least one of the first insulated boxes and effective to reduce heat loss from the first insulated box when the first insulated box is at an elevated temperature.

2. The apparatus of claim 1 wherein the heaters comprise at least seven heaters being inserted into the volumes for holding contaminated materials through each top.

3. The apparatus of claim 1 wherein the second insulated box further comprises interfaces for vapor extraction, power supply to the heaters and controls.

4. The apparatus of claim 1 wherein the tops comprises a plurality of clevis pins effective to mate with holes provided in the first boxes to align the tops with the first insulated boxes.

5. The apparatus of claim 1 wherein the heaters comprise a hollow pointed conduit pushed into contaminated material through the heater orifices, and a heater element placed into the hollow pointed conduit after the hollow conduit is pushed into contaminated material.

6. The apparatus of claim 1 wherein the first insulated boxes have a depth of at least 90% of the smaller of the first insulated boxes width or length.

7. The apparatus of claim 6 wherein the width of the first insulated box is between about 90% and 120% of the length of the first insulated box.

8. The apparatus of claim 7 wherein the depth of the first insulated box is between about two and about two and one half meters.

9. The apparatus of claim 8 wherein the second insulated box holds two of the first insulated boxes.

10. The apparatus of claim 9 wherein the first insulated box is tapered from a larger top to a smaller bottom so that a plurality of the first insulated boxes are stackable.

* * * * *